United States Patent [19]

Cathers et al.

[11] 4,398,979
[45] Aug. 16, 1983

[54] VACUUM CHANNEL METHOD OF LAMINATING GLASS SHEETS

[75] Inventors: William P. Cathers, Allison Park; John S. Ferretti, North Huntingdon, both of Pa.

[73] Assignee: PPG Industries, Inc., Pittsburgh, Pa.

[21] Appl. No.: 350,892

[22] Filed: Feb. 22, 1982

[51] Int. Cl.³ ............................................. B32B 31/00
[52] U.S. Cl. ........................................ 156/87; 100/90; 141/65; 156/103; 156/104; 156/382
[58] Field of Search ................... 156/83, 87, 103, 104, 156/382, 579; 100/90, 211; 141/65, 382

[56] References Cited

U.S. PATENT DOCUMENTS

| | | | |
|---|---|---|---|
| 1,870,284 | 8/1932 | Drake | 156/104 |
| 2,948,645 | 8/1960 | Keim | 154/2.7 |
| 2,992,953 | 7/1961 | Talburtt | 156/104 |
| 3,074,466 | 1/1963 | Little | 156/382 |
| 3,074,838 | 1/1963 | Little | 156/104 |
| 3,100,173 | 8/1963 | Boicey et al. | 156/579 |
| 3,234,062 | 2/1966 | Morris | 156/104 |
| 3,249,479 | 5/1966 | Boicey | 156/83 |
| 3,281,296 | 10/1966 | Jameson | 156/104 |
| 3,852,136 | 12/1974 | Plumat et al. | 156/103 |
| 4,362,587 | 12/1982 | Baudin et al. | 156/104 |
| 4,367,108 | 1/1983 | Valimont et al. | 156/104 |

Primary Examiner—Edward C. Kimlin
Assistant Examiner—Timothy W. Heitbrink
Attorney, Agent, or Firm—Edward I. Mates

[57] ABSTRACT

This invention involves a method of using deairing rings comprising flexible channel members of a novel construction around the periphery of an assembly of glass and flexible plastic sheets during its lamination and the construction of said novel deairing rings. The deairing rings are readily applied to and removed from the assemblies to be laminated and are so constructed as to facilitate the lamination of large windows, particularly those having sharp corners.

5 Claims, 6 Drawing Figures

VACUUM CHANNEL METHOD OF LAMINATING GLASS SHEETS

BACKGROUND OF THE INVENTION

1. Field of the Invention

This invention relates to the lamination of assemblies comprising glass and flexible plastic sheets. Laminated glass assemblies have been developed for various uses. Large glazing closures have been used in buildings. Smaller glazing closures have been used in automobiles, aircraft, other vehicles and instrument panels.

According to a typical prior art laminating technique, an assembly is formed by building up alternate sheets of glass and flexible interlayer material until the requisite number of sheets are assembled. The assembly is enclosed within an endless deairing ring comprising one or more channel-shaped members of a fluid-impervious material. The deairing ring engages the outer surfaces of a marginal portion only of the assembly and has a base portion spaced from the periphery of the assembly to provide a conduit around the margin of the assembly. The conduit is connected to a source of vacuum, and the air and other fluid that may be entrapped between the sheets of the assembly is removed by evacuation through the deairing ring.

When the fluid is removed from the interfacial surfaces of the assembly, the major surfaces of the assembly are subjected to approximately atmospheric pressure. After the evacuation proceeds for awhile, the assembly is heated to an elevated temperature sufficient to bond the glas sheets to the interlayer sheet or sheets, depending upon the number of sheets to be laminated.

A discussion of patents of interest which follows will indicate some of the problems involved in the method of laminating glass sheets using the deairing rings of the prior art.

2. Description of Patents of Interest

U.S. Pat. No. 1,870,284 to Drake discloses the use of rigid peripheral evacuation chambers to apply suction to two adjacent sides of an assembly of glass and interlayer sheets to evacuate air from the interfaces between the sheets during the lamination of the assembly. These evacuation chambers had to be aligned exactly with the thickness of the assembly undergoing evacuation because of a lack of flexible lips that engage the outside major surfaces of the assembly.

U.S. Pat. No. 2,948,645 to Keim discloses using a deairing ring comprising an endless, flexible, air-impervious channel-shaped member having flexible lips that fit over the outer edge portions of an assembly of curved glass sheets and a flexible interlayer sheet to be laminated. The channel member has a base spaced from the edge of the assembly to define a peripheral evacuation chamber around the assembly. A vacuum pipe connects to the chamber to suck fluid via the evacuation chamber from the interfaces between the elements of the assembly. A porous tape that extends completely around the assembly may be disposed within the channel-shaped member. The gist of this patent requires that the evacuation channel extend around the complete periphery of the assembly. Thus, each different outline shape of an assembly to be laminated requires a different shape for the channel-shaped member that defines the evacuation chamber. Other patents that enclose the peripheral edge of an assembly to be laminated within the lips of a deairing ring comprising a flexible channel member includes U.S. Pat. No. 2,992,953 to Talburtt, U.S. Pat. Nos. 3,074,466 and 3,074,838 to Little, U.S. Pat. No. 3,100,173 to Boicey et al., U.S. Pat. No. 3,234,062 to Morris, U.S. Pat. No. 3,249,479 to Boicey, U.S. Pat. No. 3,281,296 to Jameson and U.S. Pat. No. 3,852,136 to Plumat et al.

In all of these latter patents except for the Talburtt patent, the flexible channel members extend continuously around the periphery of the assembly to be laminated. Therefore, it is necessary to maintain an inventory of flexible channel members for each production pattern. The storage and inventory problem is tremendous. Also, the fabrication of such channel members is expensive, as it requires a separate mold for each pattern if the channel member is made in one piece, or several molds followed by a vulcanizing step if the channel member is made in sections.

U.S. Pat. No. 2,992,953 to Talburtt discloses a deairing ring formed from a grooved supporting strip and a cooperating length of flexible channel tubing that is adapted to be wrapped about the periphery of the assembly and anchored to the grooved supporting strip. The invention covered by this patent represents an improvement over the endless rings of the other patents in that the Talburtt deairing ring is not limited to specific size and is not as difficult to apply and allegedly does not require as much time to apply as the endless rings of the other patents. Instead, the Talburtt deairing ring is applied by mounting a bottom edge of the assembly into the grooved supporting strip, applying the flexible channel tubing about the remainder of the periphery of the assembly and clamping appropriate portions of the flexible channel tubing to the ends of the grooved supporting strip, leaving a length of the flexible channel tubing beyond each clamped portion. Different lengths of flexible channel tubing remain for different patterns depending on the length of the perimeter of the assembly to be laminated.

The Talburtt invention is limited in its application to automobile windshields that have an edge straight enough to be received within the grooved supporting strip and corners of sufficiently rounded configuration to enable the application of the flexible channel tubing to the periphery of the assembly without having the tubing buckle in the vicinity of any sharp corners. The Talburtt deairing rings would not be suitable for use in laminating large windows of rectangular configuration or of any polygonal configuration that incorporates sharp corners, such as are used in buildings. Furthermore, the Talburtt deairing ring is provided in its flexible channel tubing with a single tube-like connection to a vacuum line. This single vacuum connection limits the maximum size of assembly that can be evacuated in a practical manner to a size comparable to that of an automobile windshield, which is much smaller in area than laminated windows used in architectural glazing. Large size windows are more difficult to laminate using peripheral suction than smaller size windows. Furthermore, some laminated architectural glazing comprises a sheet of glass that is coated on the surface to be laminated to the interlayer. Such a coated surface is usually more difficult to adhere to an interlayer than uncoated glass.

It will be understood that the art of laminating glass sheets using deairing rings required further improvements, particularly in the lamination of extremely large laminated windows to be used for architectural purposes, and particularly windows having sharp corners.

It is understood, however, that the principles incorporated in the present invention may also be used in the fabrication of smaller windows such as those found in vehicles and in certain instrument windows.

SUMMARY OF THE INVENTION

The present invention relates to a method of laminating one or more glass sheets to a flexible plastic sheet using peripherally extending deairing rings connected to a vacuum source. The deairing rings of the present invention comprise a plurality of flexible, channel-shaped members having flexible lips biased to engage the edge portions of the outer major surfaces of an assembly formed by mounting the sheets in aligned relation to one another. The flexible, channel-shaped members also include a base that is spaced from the periphery of the assembly when the channel-shaped members are applied to enclose the periphery of the assembly.

The plurality of flexible, channel-shaped members are applied in spaced relation from one another about the periphery of the assembly to provided spaced passages about the periphery. A connecting channel-shaped member encompassing a larger cross-section than those of the flexible channel-shaped members is applied over the adjacent ends of each pair of adjacent of said spaced, flexible, channel-shaped members in such a manner as to provide a passage connecting each of said spaced passages. Thus, the flexible, channel-shaped members and the connecting channel-shaped members cooperate to provide interconnecting passages that form a continuous evacuation chamber extending around the periphery of the assembly to be laminated. At least one of the channel-shaped members is connected to a source of vacuum so that the assembly may be evacuated to remove fluid from the interfacial surfaces of the sheets that form the assembly.

In a preferred embodiment of the present invention used in the lamination of large laminated windows for architectural purposes, the connecting channel-shaped members are disposed at each of the sharp corners of the rectangular shaped assembly, and each of the connecting channel-shaped members has a pipe communicating with the channel and adapted for connection to a source of vacuum. In this manner, a multiplicity of vacuum connections is provided to facilitate the removal of entrapped fluid throughout the extent of relatively large assemblies to be laminated into large laminated windows.

It is also understood that the present invention is also useful in the fabrication of non-rectangular shapes and also may be used in the lamination of so-called bilayer windows comprising a single sheet of glass laminated to a single sheet of flexible plastic material. In such a case, a second sheet of glass provided with a suitable parting material is assembled in facing relation to the opposite major surface of the flexible plastic interlayer sheet that is to be laminated against the single glass sheet to form the laminated window and separated from the resulting assembly when the bilayer window is ready for installation.

These and other characteristics of the present invention will be understood in greater detail after the reader has had an opportunity to read a description of a preferred embodiment of the present invention that follows.

BRIEF DESCRIPTION OF THE DRAWINGS

In the drawings, where like reference numbers refer to like structural elements.

DESCRIPTION OF THE PREFERRED EMBODIMENT

Figure 1:
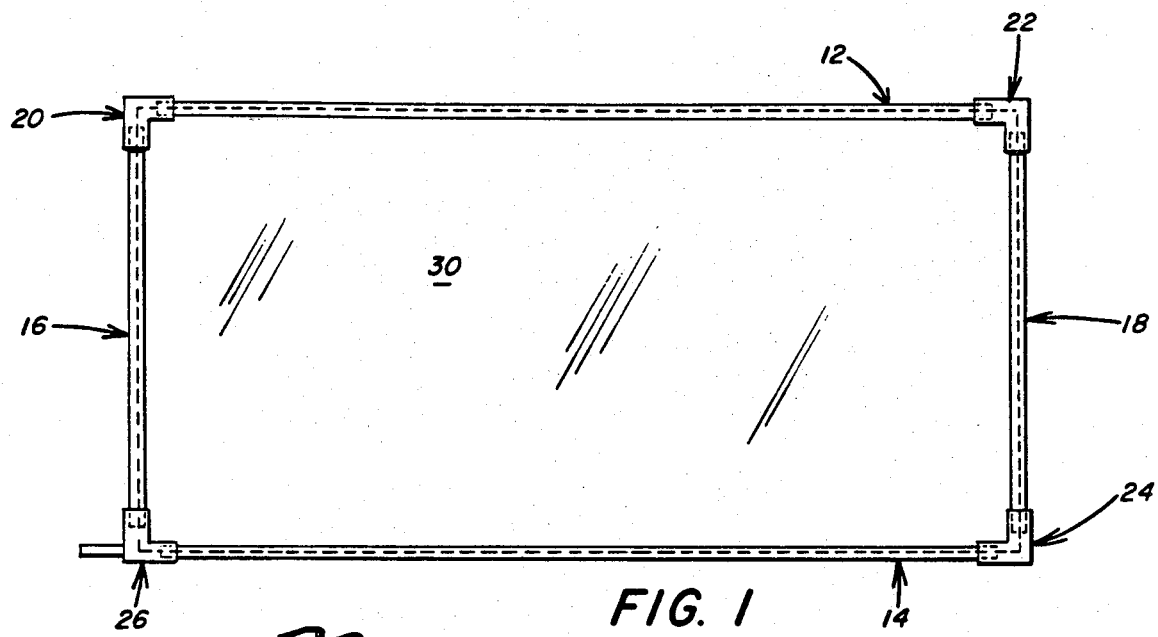
FIG. 1 is a plan view of an assembly to be laminated showing how the deairing ring of the present invention is constructed and mounted about the assembly for removal of entrapped fluid between the interfacial surfaces of the assembly.
Figure 2:
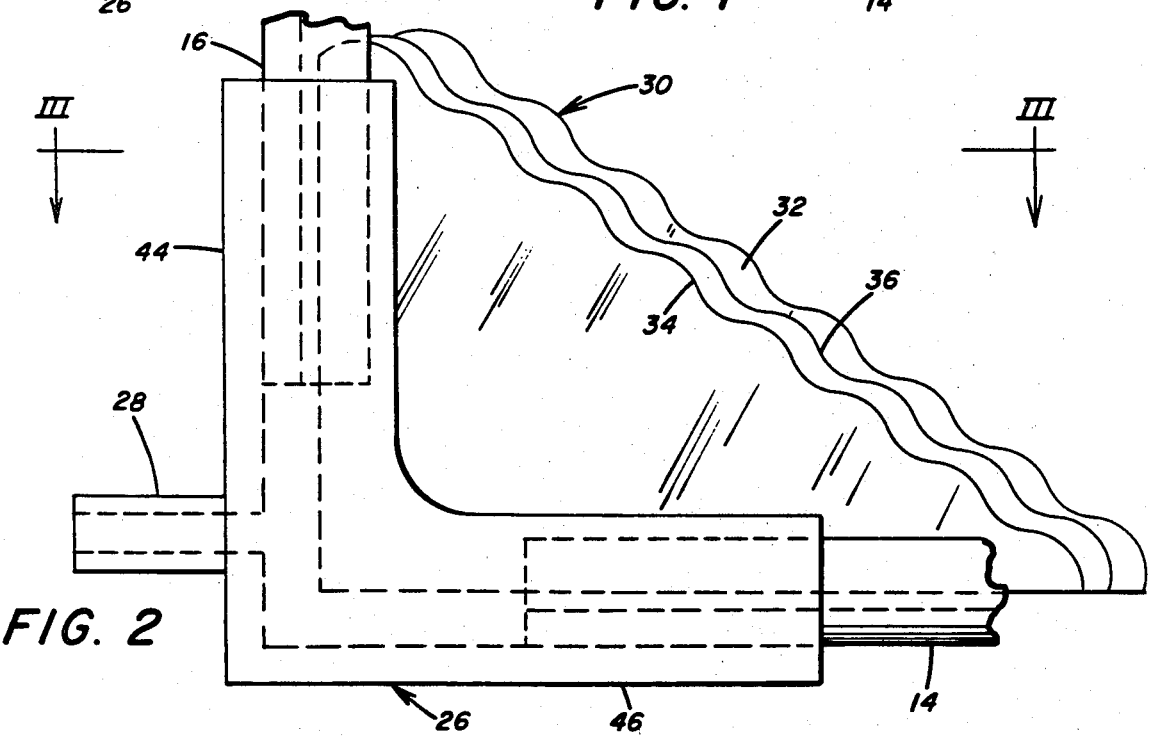
FIG. 2 is an enlarged view of a corner portion of the assembly shown in FIG. 1.
Figure 3:
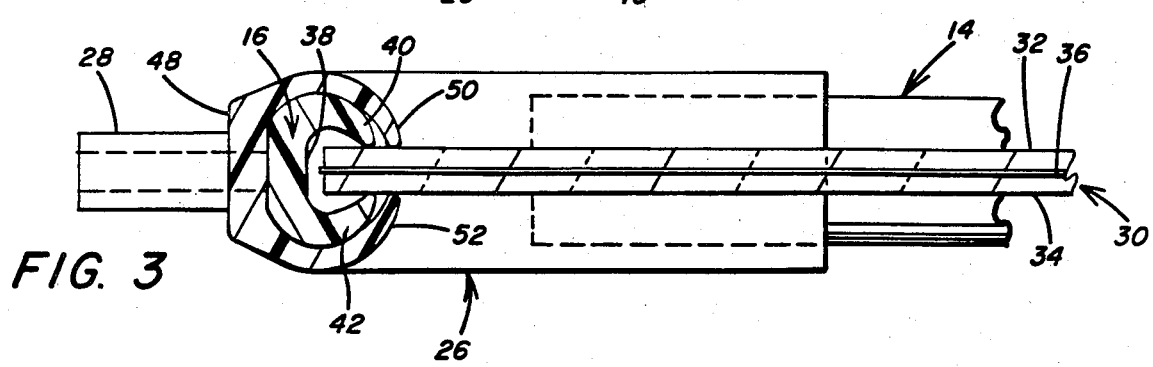
FIG. 3 is a cross-sectional view taken along the lines III—III of FIG. 2.

Referring to FIGS. 1 to 3, a deairing ring is shown with a large assembly of rectangular outline. The deairing ring comprises a first flexible side channel-shaped member 12, a second flexible side channel-shaped member 14, a first flexible end channel-shaped member 16 and a second flexible end channel-shaped member 18 shown in spaced relation about the periphery of an assembly 30 to be laminated. The deairing ring of the present invention also comprises four connecting channel-shaped members 20, 22, 24 and 26. These latter are mounted in overlapping relation to the adjacent ends of adjacent, spaced, flexible side and end channel-shaped members. Connecting channel-shaped member 20 is shown mounted over the adjacent ends of side channel-shaped member 12 and end channel-shaped member 16. Connecting channel-shaped member 22 is shown mounted over the adjacent ends of side channel-shaped member 12 and end channel-shaped member 18. Connecting channel-shaped member 24 is shown mounted over the adjacent ends of end channel-shaped member 18 and side channel-shaped member 14. Connecting channel-shaped member 26 is shown superimposed over the adjacent ends of side channel-shaped member 14 and end channel-shaped member 16. While a vacuum pipe 28 is shown extending only from the connecting channel-shaped member 26, it is understood that each or any of the channel-shaped members may be provided with a vacuum pipe as needed, depending upon the size of the assembly to be laminated. The channel shaped members are all composed of rubber having a preferable Shore "A" durometer of 50 to 60.

The assembly 30 to be laminated comprises a first glass sheet 32, a second glass sheet 34 and an interlayer sheet 36, which is preferably composed of plasticized polyvinyl butyral. If the assembly to be laminated comprises two glass sheets and an interlayer, the assembly is made with the sheets in the order shown in FIGS. 2 and 5. If the assembly to be laminated is a so-called bilayer construction, the major surface of either glass sheet 32 or glass sheet 34 is covered with a suitable parting material so that the coated glass sheet may be separated from the remaining sheets of the assembly after lamination is completed. U.S. Pat. No. 3,808,077 to Reiser and Chabal discloses a technique for making such bilayer windshields.

Each of the flexible, side or end channel-shaped members is straight and has a length slightly shorter than the length of the assembly to which it is mounted, side flexible channel-shaped members 12 and 14 being slightly shorter than the corresponding sides of the assembly 30 and end flexible channel-shaped members 16 and 18 being slightly shorter than the corresponding ends of the assembly 30 on which they are mounted, so that the ends of the flexible side and end channel-shaped members are separated about the periphery of the assembly 30. Each of the side or end channel-shaped members 12 to 18 comprises a pair of flexible lips 40 and 42 that extend from a relatively rigid base 38 to form a passage. The base is spaced from the periphery of the assembly 30 and the lips 40 and 42 are biased to be compressed against the outer major surfaces of the assembly 30 so as to provide a passage along the length of each of the flexible side channel-shaped members 12 and 14 and end channel-shaped members 16 and 18.

Each of the connecting channel-shaped members 20 comprises a first leg 44 and a second leg 46. In cross-section, the connecting channel-shaped member comprises a relatively rigid base 48 wider than rigid bases 38 and a pair of flexible lips 50 and 52. The flexible lips 50 and 52 of the connecting channel-shaped members 20, 22, 24 and 26 are biased toward each other and are considerably longer than the flexible lips 40 and 42 of the side and end flexible channel-shaped members 12, 14, 16 and 18 so as to enable the connecting channel shaped members to be applied in superimposing relation over the adjacent end portions of the spaced flexible side and end channel-shaped members. The legs 44 and 46 of the connecting channel-shaped members 20, 22, 24 and 26 are angled to conform to each of the sharp corners of the assembly 30 and are mitered to one another at the corners formed by the legs. The connecting channel-shaped members are likewise spaced from the peripheral portions of the assembly intermediate the ends of the flexible, side and end channel-shaped members 12, 14, 16 and 18 so as to provide passages connecting the spaced passages of the spaced side and end flexible channel-shaped members. In this manner, it is easy to apply the individual side and end channel-shaped members and the connecting channel-shaped members to provide a continuous evacuation passage extending around the entire periphery of the assembly 30.

As stated previously, a vacuum pipe 28 is shown connected to connecting channel-shaped member 26. Additional vacuum pipes may be provided where desired on any of the eight channel-shaped members forming part of the peripheral evacuation chamber surrounding the rectangular assembly 30 to FIGS. 1 to 3.

The connecting channel-shaped members 20, 22, 24 and 26 are shown at right angled construction with their legs 44 and 46 extending at right angles to one another. This construction enables the flexible lips 50 and 52 of the legs 44 and 46 to extend over the flexible lips 40 and 42 of adjacent flexible channel-shaped members 12, 14, 16 and 18 and the rectangular corners of the rectangular assembly 30.

Figure 4:
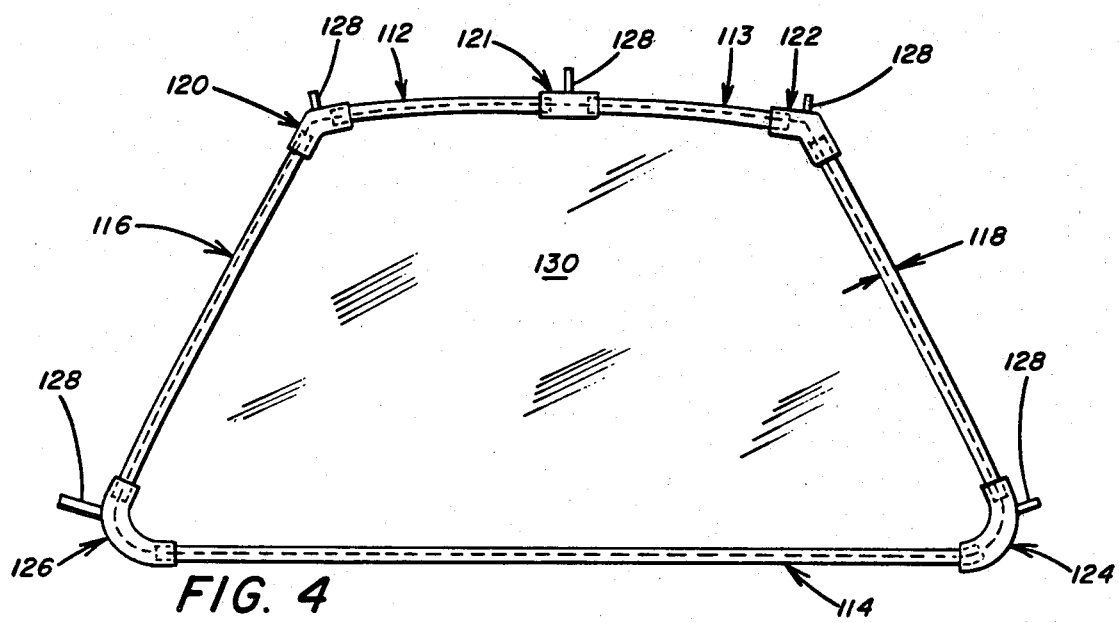
FIG. 4 is a view similar to FIG. 1 of an alternate embodiment of the invention used in the fabrication of laminated windows of non-rectangular outline.
Figure 5:
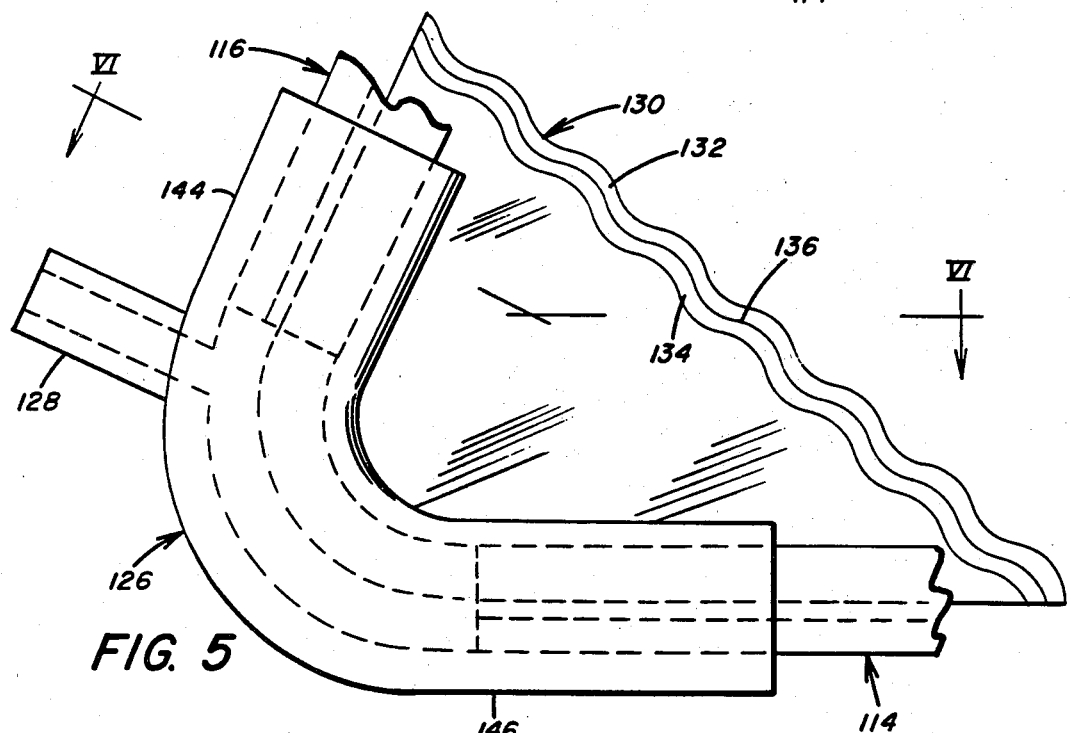
FIG. 5 is a enlarged view of one of the corners of the assembly depicted in FIG. 4.
Figure 6:
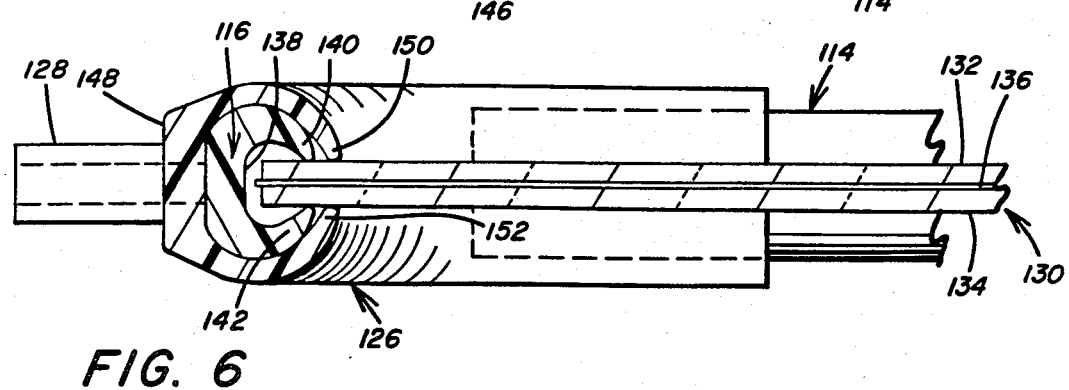
FIG. 6 is a sectional view taken along the lines VI—VI of FIG. 5.

Alternate embodiments of the present invention are illustrated in FIGS. 4 to 6. One of the alternate embodiments involves the substitution for one of the flexible side channel-shaped members 12 of two spaced flexible side channel-shaped members 112 and 113. The opposite flexible, channel-shaped member 114 extends almost the entire length of the other side of a non-rectangular assembly 130. The flexible end channel-shaped members 116 and 118 extend along the opposite ends of the non-rectangular shaped assembly 130 and terminate short of the corners which are occupied by connecting channel-shaped members 120, 122, 124 and 126. An additional connecting member 121 is included in this embodiment to provide a passage interconnecting the passages formed by the flexible, side channel members 112 and 113. It is noted in this embodiment that all of the connecting channel-shaped members 120, 121, 122, 124 and 126 are provided with vacuum pipes 128 which are adapted for connection to a source of vacuum (not shown).

Since the corners are not square, the connecting members that occupy the corner portions of the modified non-rectangular assembly 130 are composed of legs 144 and 146 that are disposed at different angles from the right angle arrangement of the legs 44 and 46 for the connecting channel-shaped members superimposed over the spaces between the flexible side channel-shaped members and adjacent flexible end channel-shaped members at the corners of the first assembly 30. In this embodiment, the legs 144 are at angles other than right angles to the legs 146 that conform to the shapes of the corners of the non-rectangular assembly 130.

In the alternate embodiment, it is also understood that vacuum pipes may be applied to any one or more of the flexible side channel-shaped members and/or of the flexible side channel-shaped members 112, 113 and 114 and/or of the flexible end channel-shaped members 116 and 118, as well as to the connecting members as indicated in FIG. 4.

Each of the flexible, channel-shaped members comprises a base 138 and a pair of flexible lips 140 and 142 which are similar in construction and operation to the lips 40 and 42 and the base 38 of the flexible, channel-shaped members of the first embodiment. Similarly, the connecting channel-shaped members each comprise a base 148 similar to the base 48 of the first embodiment and lips 150 and 152 similar in construction and operation to the lips 50 and 52 of the first embodiment, except for the relative orientation of the legs 144 and 146.

LAMINATING PROCEDURES

Each assembly of rectangular outline fabricated for test purposes was enclosed in four flexible side and end channel-shaped members spaced at the corners of the rectangularly shaped units with right angle connecting members disposed at each corner of the unit. The flexible side and end channel-shaped members extended continuously from approximately one inch (2.5 centimeters) away from one corner to approximately one inch (2.5 centimeters) away from the next adjacent corner, and the connecting channel-shaped members comprising mutually perpendicular legs were disposed to overlap the last two inches (five centimeters) of each of the side or end channel-shaped members extending toward the corner. A vacuum pipe extended outward from and through the leg of the connecting member provided with said vacuum pipe at less than approximately one inch (2.54 centimeters) from the mitered corner of each connecting member.

Assemblies of the two glass sheets and a plastic interlayer sheet of polyvinyl butyral plasticized by various plasticizers supplied by DuPont in various sizes and thicknesses were tested with the following results. The lamination was performed by applying a vacuum of 23 to 25 inches (58 to 64 centimeters) of mercury for 15 minutes at room temperature. The evacuation was continued for an additional 30 minutes in an oven maintained at 275° F. (135° C.). The vacuum was discontinued and the assembly heating continued until the total heating time in the oven approximated 50 to 60 minutes.

One hundred percent yield was obtained using heat-strengthened glass sheets of float glass in pairs of glass sheets of matching thickness of 7/32 inch (5.6 millimeter) thickness. Glass sheets tested were fourteen assemblies 30 inches (76 centimeters) square and three assemblies containing glass sheets 34 inches (86 centimeters) by 76 inches (193 centimeters). The interlayer for each of these assemblies was a plasticized polyvinyl butyral of the DuPont Company identified as B-10 interlayer with a thickness of 60 mils (1.52 millimeters). The interlayer material was preconditioned by hanging in a room maintained at less than 18 percent relative humidity at a temperature approximating 68° to 70° F. (20° to 21° C.).

Approximately seventy-five percent yield of good quality laminates were produced in assemblies of heat-strengthened glass sheets having a thickness of 7/32 inch (5.6 millimeters) with plasticized polyvinyl butyral identified as DuPont B-10 plastic 30 mils (0.76 millimeters) thick. The same treatment applied and the same outline sizes of assemblies as were tested previously were tested with the different thicknesses of interlayer material. Approximately 50 to 60 percent of this group of units had unclear areas when the oven cycle was completed. However, these areas were cleared by applying a portable infrared spot heater to those uncleared areas either while the unit was still hot or even after it had cooled to room temperature.

Additional units comprising two heat-strengthened glass sheets 30 inches (76 centimeters) square and ⅛ inch (3.2 millimeters) thick and another unit containing two glass sheets 34½ inches (88 centimeters) by 68 inches (173 centimeters) and ⅛ inch (3.2 millimeters) thick were successfully laminated to polyvinyl butyral sheets 60 mils (1.52 millimeters) thick plasticized according to DuPont's B-10 interlayer material.

Five additional assemblies containing two heat-strengthened glass sheets 30 inches (76 centimeters) by 30 inches (76 centimeters) and one assembly containing two heat-strengthened glass sheets 34 inches (86 centimeters) by 76 inches (193 centimeters) and 7/32 inch (5.6 millimeters) thick using plasticized polyvinyl butyral identified as DuPont B-14 plastic at a thickness of 30 mils (0.76 millimeter) were successfully laminated. The glass sheets of these successful laminates had a bow and a warp of less than ⅛ inch (3.2 centimeters) prior to assembly.

More recent tests performed successfully with assemblies of various sizes and glass sheet thicknesses eliminated the 15 minute pre-evacuation step at room temperature. The laminating procedure for these test assemblies comprised inserting the assembly and the deairing ring while at room temperature in an autoclave maintained at 275° F. (135° C.) while evacuating the peripheral evacuation chamber at 23 to 25 inches (58 to 64 centimeters) of mercury for 30 minutes. The vacuum was discontinued and the assembly remained in the heated oven at a temperature of 275° F. (135° C.) for an additional 20 to 30 minutes at atmospheric pressure.

In another embodiment of this invention, one pair of opposite flexible channel-shaped members were coextensive in length with the adjacent sides of the assembly and the other pair of opposite flexible channel-shaped members had the end portions of their bases removed a sufficient distance inward from their ends to enable the passages formed by the flexible channel members to communicate with the vacuum pipes extending from the legs of the connecting vacuum shaped members that were aligned with the removed base portions. For a rectangular shaped assembly, each of the four corners were provided with a removed base portion and a vacuum pipe. However, it is within the gist of this invention to have less than the four corner portions so modified.

Laminates produced by the method of this invention were compared to laminates produced by the autoclave process, in which the assemblies were prepressed to remove entrapped air from the interfacial surfaces of the assembly and then immersed in an oil autoclave and subjected to the standard commercial procedure for laminating in an oil autoclave, and the results indicated that the laminates produced by the methods described in the embodiments previously mentioned were equal to or better than the laminates produced by the autoclave process. It is noted, however, that the laminates produced by the autoclave process did not have the interlayer material subjected to such a dry atmosphere to condition the interlayer material to have a low moisture content, as was the case with those produced using the present invention.

These tests included a five pound ball drop test conducted at −20° F. (−29° C.), 70° F. (21° C.) and 150° F. (66° C.). In these ball drop tests, the entire laminate was supported on a frame and the five pound ball dropped from increasing heights onto the center of the laminate until the ball penetrated.

The second test involved immersing the laminate in a tank of boiling water. The test laminate was inspected for bubbles and moisture penetration after two hours of boiling and four hours of boiling.

A third test performed to compare laminates produced by the present invention with those produced by the autoclave process was a humidity test. During this test, the laminates were subjected for several days to an atmosphere at 100 percent relative humidity and periodically inspected for the presence of bubbles within the edge and for moisture penetration as in the various boil tests described in the preceding paragraph.

The fourth test was known as the 100 pound shot bag test. In this test a bag containing 100 pounds of shot is dropped onto the center of the laminate from a standard height. The laminate either passes or fails this test.

It is understood that the omission of an oil autoclave treatment avoids the necessity of cleaning the surfaces of the laminate after the lamination is completed.

The form of the invention shown and described in this disclosure represents an illustrative preferred embodiment and certain modifications thereof. It is understood that various changes other than those specified herein may be made without departing from the gist of the invention as defined in the claimed subject matter which follows.

What is claimed is:

1. A method of laminating one or more glass sheets of substantially identical polygonal outline to a flexible plastic sheet of substantially similar polygonal outline to form a polygonal laminated assembly having straight sides and sharply bent corners comprising mounting said sheets in aligned relation to form an assembly of polygonal configuration, applying to each straight side of said assembly at least one straight, flexible, channel-shaped member having flexible lips extending from the base of said channel-shaped member and a length shorter than the corresponding straight side of said assembly in such a manner that said flexible lips engage the edge portions of the outer major surfaces of said assembly along a substantial portion of the lengths of said corresponding straight sides and said bases of said straight channel-shaped members are in spaced relation to said corresponding straight sides to form straight passages between said bases and said straight sides enclosed by said flexible lips, said passages terminating short of said sharply bent corners, applying a sharply angled channel-shaped member having flexible lips of different length than those of said straight, flexible, channel-shaped members and a base of different width than said bases of said straight, flexible channel-shaped members to each of said sharp corners in such a manner that said flexible lips of said sharply angled channel-shaped members engage the edge portions of the outer major surfaces of said assembly at each of said sharply bent corners and also extend from said sharply bent corners sufficient distance to be in overlapping relation with the flexible lips at the end portions of adjacent of said straight, flexible, channel-shaped members to cooperate with said straight, flexible, channel-shaped members to form a continuous chamber around said polygonal assembly, and connecting at least one of said channel-shaped members to a source of vacuum to remove entrapped fluid from any interfacial surface between said sheets through said continuous chamber.

2. The method as in claim 1, wherein the major portion of each side of the periphery of said assembly is enclosed within a different one of said straight, flexible, channel-shaped members continuously along said substantial portions of the lengths of said straight sides in such a manner that each sharp corner of said periphery is beyond either end of said passage said straight, flexible, channel-shaped members forms with a corresponding portion of said periphery, and applying a different one of said sharply angled channel-shaped members having longer lips than said straight, flexible, channel-shaped members over the adjacent ends of adjacent of said straight, flexible, channel-shaped members and over a corresponding one of said exposed sharp corners to provide a passage at said exposed corner connecting the ends of the passages formed by said adjacent, flexible channel-shaped members.

3. The method as in claim 1, wherein a plurality of straight, flexible, channel-shaped members are applied in spaced relation along the length of at least one of said straight sides of said assembly, and an additional straight, flexible, channel-shaped member having flexible lips longer in length than that of said first named straight, flexible, channel-shaped members and a base of different width than the bases of said first named straight, flexible, channel-shaped members is applied over the end portions of adjacent of said first named, straight, flexible, channel-shaped members so that its longer flexible lips are in overlapping relation with the flexible lips of said first named straight, flexible, channel-shaped members and the edge portions of the outer major surfaces of said assembly between the end portions of said adjacent, first named, straight, flexible, channel-shaped members to provide a continuous passage along said straight side of said assembly.

4. The method as in claim 1, wherein said assembly has an outline that is a rectangle, characterized by applying a different straight, flexible, channel-shaped member having a length shorter than a corresponding side of said rectangle to each side of said rectangle in such a manner that the corners of the rectangle are beyond said member and applying a connecting channel-shaped member having mutually perpendicular legs over said corners in overlapping relation to the adjacent ends of adjacent of said flexible, channel-shaped members.

5. The method as in claim 3, further characterized by connecting a plurality of said sharply angled channel-shaped members directly to a vacuum source.

* * * * *